May 28, 1946.  P. M. GRIFFIN  2,401,240
ANGLE DRIVE MECHANISM
Filed March 3, 1943   2 Sheets-Sheet 1
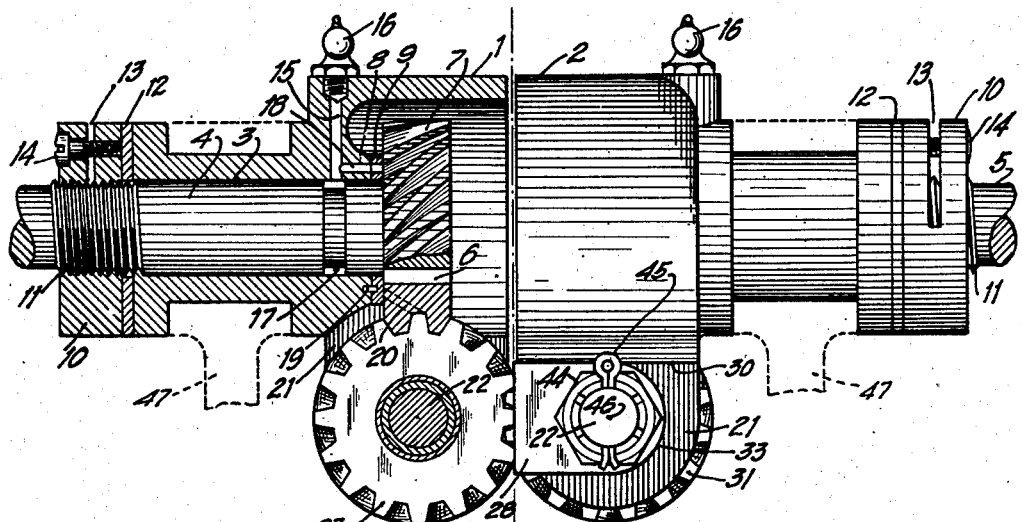
FIG. 1
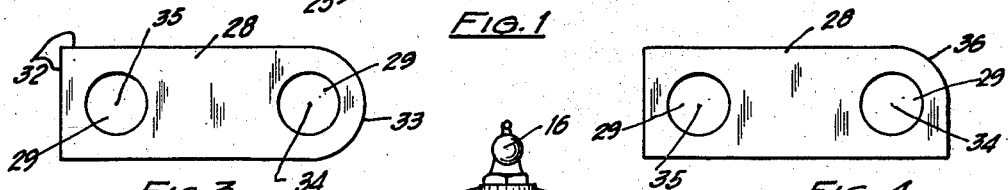
FIG. 3      FIG. 4
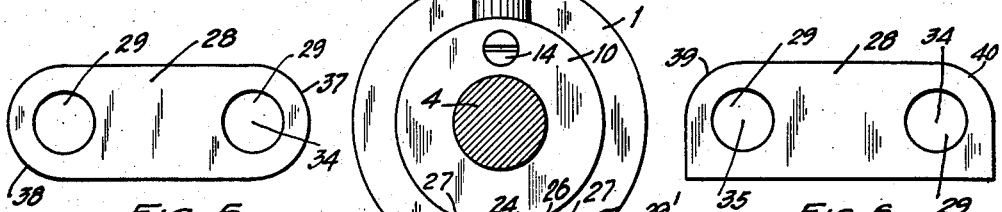
FIG. 5      FIG. 6
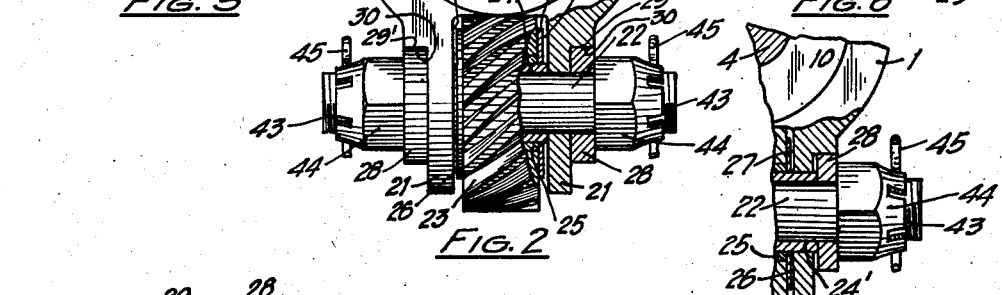
FIG. 2      FIG. 12
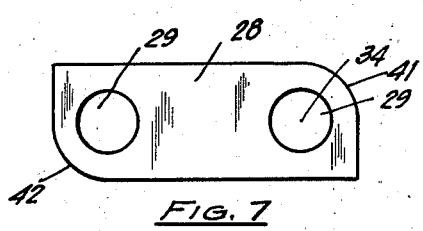
FIG. 7
INVENTOR
Percy M. Griffin
by
ATTORNEY May 28, 1946.    P. M. GRIFFIN    2,401,240
ANGLE DRIVE MECHANISM
Filed March 3, 1943    2 Sheets-Sheet 2

INVENTOR
Percy M. Griffin
by
ATTORNEY

Patented May 28, 1946

2,401,240

UNITED STATES PATENT OFFICE 2,401,240

ANGLE DRIVE MECHANISM

Percy M. Griffin, Albany, N. Y., assignor to Consolidated Car-Heating Company, Inc., Albany, N. Y., a corporation of New York Application March 3, 1943, Serial No. 477,893

5 Claims. (Cl. 74—383)

My invention relates to driving mechanisms and particularly to a device for connecting a driving shaft with a driven shaft which is angularly disposed thereto. The angle between the shafts may be any angle between 0° and 180°, and while the device is intended primarily to connect together two shafts whose axes are coplanar and disposed at a fixed angle to each other it may be pointed out that the angle between the shafts may be varied within the above range while the shafts are rotating, and therefore the device may be used as a flexible joint although, if one shaft is assumed to be fixed, swinging movement of the other shaft is limited to movements in one plane only.

The principal object of the invention is to provide a shaft connecting mechanism of this type through which a constant torque will be transmitted irrespective of the angle between the shafts, and in which the friction losses will be low and substantially constant irrespective of the angle between the shafts. Another object is to provide a device of this character in which standard spiral gears are employed. A further object is to provide such a device consisting of two, substantially identical half-portions whereby fabrication thereof is simplified and its cost minimized. A still further object is to provide a device of this character which will be an improvement over that disclosed in copending application Serial No. 472,820 filed January 19, 1943, of which I am one of the co-inventors.

With these objects in view my invention includes the novel elements and the combinations and arrangements thereof described below and illustrated in the accompanying drawings in which—

Fig. 1 is a side elevation view partially in section of my device;

Fig. 2 is an end elevation view with certain portions broken away to show details of construction;

Figs. 3, 4, 5, 6 and 7 are side elevation views showing various types of links which may be employed to connect the two halves of the device together;

Fig. 12 is a fragmentary end elevation view with certain portions broken away, as in Fig. 2, to show a modification in construction.

Figure 8:
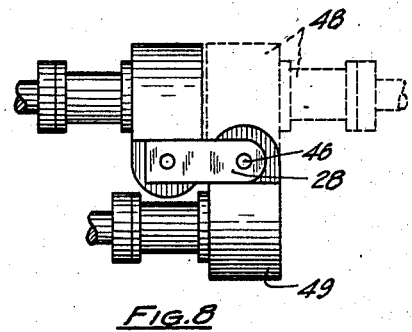
Figs. 8, 9, 10 and 11 are small scale, more or less schematic side elevation views of the device showing a few of the many ways in which it may be applied.

Referring to the drawings, the device comprises a housing formed in two separate halves 1 and 2 which may be in all respects identical. Each half-housing is provided with a bore 3 adapted to receive a shaft, such as 4 or 5, and either of which may be considered the driving shaft. Within each half-housing and keyed to the associated shaft, as shown at 6, is a spiral gear 7 having the teeth cut on a 45° angle. Interposed between the gear 7 and the interior boss 8 in the housing is a thrust washer 9 which may be of the self lubricating type, such as those commercially known as "Oilite," and the gear 7 is held in close, running fit with the washer 9 by means of the internally threaded collar 10 which cooperates with a threaded portion 11 of the shaft. A second "Oilite" washer 12 is interposed between the collar 10 and the end of the housing and the collar 10 is split, as shown at 13, so that it may be clamped in adjusted position by means of the screw 14. Each half-housing is also provided with a bore 15 into which lubricant may be forced through a fitting 16. The bore 15 communicates with the groove 17 in shaft 4 and also with a crossbore 18 which registers with a hole in washer 9; the hole in the washer being held in registration with the crossbore 18 by means of the pin 19 which prevents it from turning. Lubricant forced into the bore 15 passes into crossbore 18 and through passages 20 in the gear 7 which conduct it to the gear teeth. Each half-housing is provided with spaced depending ears or lugs 21 which are bored to receive the shaft 22 on which a spiral gear 23 is mounted to rotate. A steel bushing 24 around shaft 22 fits closely between the ears 21 and a shorter, "Oilite" bushing 25 surrounds the steel bushing. Thrust washers 26 are interposed between the sides of the gear and the insides of the ears 21. Although considerable clearance 27 is shown between the thrust washers and the inside of the ears it is understood that, this clearance need not exceed that necessary to prevent binding of the gears 23 and 31 when the nuts 44 are tightened. The gear 23 is in mesh with gear 7 and its axis is at right angles to the axis of the gear 7. In order to have these gears at this angle both gears should be of the same hand.

The two half-housings are connected together by links 28 which are provided at each end with holes 29 adapted closely to fit shaft 22. The half-housings are undercut at the sides, as shown at 29', to provide ledges 30 which overlie and closely engage the tops of the links 28. The holes 29 in the links 28 are so spaced as to hold the gears 23 and 31 in meshed relation with their axes parallel to each other, and in order that two spiral gears may mesh in this way one of the gears must be a right hand gear and the other a left hand. Hence it follows that, if the spiral gears in the left hand half-housing, as viewed in Fig. 1, are left hand gears the corresponding two gears in the right half-housing must be right hand gears.

The links which hold the half-housings together may be of various types. Thus in Fig. 3 the link is shown square at one end, as at 32, and round at the other end, as at 33; the round end being a cylinder having its center at the center 34 of the adjacent hole 29. At the square end, the top, bottom and end of the link are equidistant from the center 35 of the adjacent hole 29, so that the link may be turned 90° about the center 35 and the end will cooperate with the ledge on the housing, as shown in Fig. 9. Thus, by making one end of the link square, the link when positioned beneath the ledge 30 on one half-housing is held in fixed relation to that half-housing. By making the other end of the link a complete semi-cylinder, as shown in Figs. 1 and 3, the right hand half-housing may be turned 180° about the center 46 from the position shown in Fig. 1 to the position shown in Fig. 8. The links may take other forms such, for example, as shown in Fig. 4 in which only one corner 36 of the link is rounded; Fig. 5 shows a link in which each end 37 and 38 is a complete semi-cylinder; Fig. 6 shows a link in which the upper corners 39 and 40 only are rounded; and Fig. 7 shows a link in which the diagonally opposite corners 41 and 42 are rounded.

In order to hold the half-housings in adjusted angular relation to each other the ends of the shafts 22 are threaded, as shown at 43, and castellated nuts 44 are threaded thereon and secured by means of the cotter pins 45. Thus, when the nut 44 shown in Fig. 1 is tightened the ears 21 are tightly compressed against the ends of the steel bushing 24 so that the right half-housing, as viewed in Fig. 1, cannot be rotated about the axis 46 of the shaft 22. However by loosening one of the nuts 44 the angular relation of the shafts 4 and 5 may be varied, and they may be secured in adjusted angular relation to each other by merely tightening the nut. Where the shafts are permanently disposed at a given angle floor or wall brackets 47 shown in dotted outline in Fig. 1 may be employed.

Instead of positioning the steel bushing 24 between the ears 21, as shown in Fig. 2, it may extend through the ears, and slightly beyond, as shown at 24' in Fig. 12, so that the links 28 abut the ends thereof. Thus, when the nuts 44 are tightened the half-housings are held in adjusted angular relation to each other by frictional engagement of the links with the ends of the steel bushing.

Figure 9:
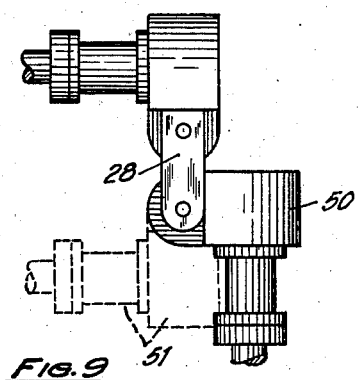

Fig. 8 shows how the right hand half-housing may be rotated about the axis 46 from the position shown in dotted outline 48 in which the shafts are coaxial to the position 49 in which the shafts are parallel and relatively closely spaced. In Fig. 9 the link 28 has been turned 90° from the position shown in Fig. 8 and it is understood to be in fixed relation to the half-housing which cooperates with the square end thereof. In this view the other end of the link is a complete semi-cylinder and the other half-housing 50 may be rotated from the position shown in solid lines to the position 51 shown in the dotted lines. Obviously it could be rotated still further and until the shafts interfered with each other.

Figure 10:
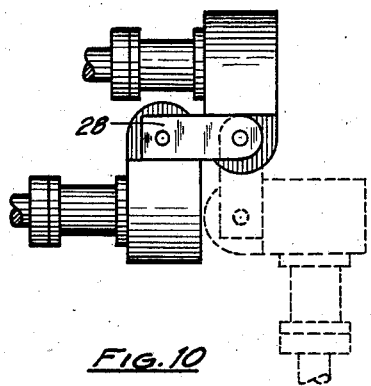

In Fig. 10 the arrangement is quite similar to that illustrated in Fig. 8, except that the link 28 has been turned end for end.

Figure 11:
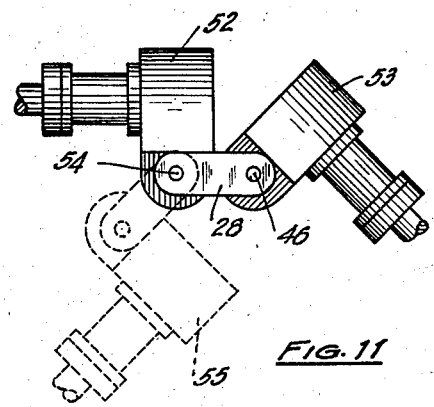

In Fig. 11 both ends of the link 28 are semi-cylindrical. If the link is first assumed to be held in fixed relation to the half-housing 52, the half-housing 53 may be rotated 180° about the axis 46. That is, from the position shown in Fig. 1 to the position shown in Fig. 8. On the other hand, if the link 28 be assumed to be held in fixed relation to the half-housing 53 then, the half-housing 53 and the link may be revolved about the axis 54 to and beyond the position 55 shown in dotted outline.

From the foregoing it will be apparent that my device may be used to connect any two shafts whose axes are coplanar and disposed to each other at any angle between 0° and 180°. Furthermore, when the axes are parallel they may be various distances apart, and when they intersect at any given angle, the position of the point of intersection may be varied to a considerable extent. It will also be apparent that there is no reversal of motion; clockwise rotation of shaft 5 always producing a clockwise rotation of shaft 4.

By reason of the link 28 which connects the driving unit to the driven unit, rotation of either unit about the axis of its associated idler and through an arc of about 180° is provided which is entirely independent of movement about the axis of the other idler (see Fig. 8). On the other hand, orbital movement of each unit about the axis of the idler in the other unit is provided which is entirely independent of movement of the unit about the axis of the idler associated therewith (see Fig. 10). By employing a link of the type shown in Fig. 11, relative movement of said units is provided about the axis of either idler or about the axes of both idlers.

What I claim is:

1. An angle driving mechanism comprising two spiral gears meshed with each other and having parallel disposed axes, a bearing for each of said gears, a third spiral gear in mesh with one of said first mentioned gears and having its axis angularly disposed to the axis of the gear in mesh therewith, a bearing for said third gear, a fourth spiral gear in mesh with the other of said first mentioned gears and having its axis angularly disposed to the axis of the gear in mesh therewith, a bearing for said fourth gear, and means pivotally connecting the bearings for said third and fourth gear together so constructed and arranged that at least one of said last mentioned bearings may be revolved about the axis of one of said first mentioned gears.

2. An angle driving mechanism comprising two meshed spiral gears having parallel disposed axes, a bearing for each of said gears, a third spiral gear in mesh with one of said first mentioned gears and having its axis angularly disposed to the axis of the gear in mesh therewith, a bearing for said third gear, a fourth spiral gear in mesh with the other of said first mentioned gears and having its axis angularly disposed to the axis of the gear in mesh therewith, a bearing for said fourth gear, and a link connecting the bearings of said first mentioned gears together and maintaining the axes of said gears a fixed distance apart but providing relative revoluble movement thereof.

3. An angle driving mechanism comprising two meshed spiral gears having parallel disposed axes, a bearing for each of said gears, a third spiral gear in mesh with one of said first mentioned gears and having its axis angularly disposed to the axis of the gear in mesh therewith, a bearing for said third gear, a fourth spiral gear in mesh with the other of said first mentioned gears and having its axis angularly disposed to the axis of the gear in mesh therewith, a bearing for said fourth gear, and a link pivotally connecting the bearings for said first mentioned gears together on the axes thereof.

4. An angle drive mechanism comprising a first housing, a pair of meshed spiral gears mounted therein with their axes at right angles to each other, a second housing, a pair of meshed spiral gears mounted in said second housing with their axes at right angles to each other, and means pivotally connecting said housings together with one of the gears in said first housing in mesh with one of the gears in said second housing; said last mentioned gears having their axes disposed in parallel relation, and the pivotal axis of said connecting means being substantially coincident with the axis of one of said last mentioned gears.

5. An angle drive mechanism comprising a first housing, a pair of meshed spiral gears mounted therein with their axes at right angles to each other, a second housing, a pair of meshed spiral gears mounted in said second housing with their axes at right angles to each other, a link pivotally connecting said housings together with one of the gears in said first housing in mesh with one of the gears in said second housing; said last mentioned gears having their axes disposed in parallel relation and the pivotal axes of said link being coincident with the pivotal axes, respectively, of said last mentioned gears; whereby each housing may be rotated about one of said axes and also revolved about the other of said axes; and means for securing each housing against movement relative to said link.

PERCY M. GRIFFIN.